United States Patent Office 3,122,527
Patented Feb. 25, 1964

3,122,527
POLYMERIZATION OF OLEFINS WITH CATALYST CONTAINING ADDUCT OF ALKALI METAL AND POLYNUCLEAR AROMATIC COMPOUND
Frederick J. Webb and Alfred C. Whiton, Cuyahoga Falls, Ohio, assignors to The Firestone Tire & Rubber Company, Akron, Ohio, a corporation of Ohio
No Drawing. Filed Aug. 17, 1956, Ser. No. 604,594
10 Claims. (Cl. 260—94.9)

This invention relates to the polymerization of alpha-mono-olefins, and particularly of ethylene, to yield high molecular weight polymers using certain complex catalysts more particularly described hereinafter.

It has heretofore been proposed to polymerize ethylene and other unsaturated hydrocarbons in the presence of catalysts which are reaction products of various metal alkyls (i.e., compounds in which a metal atom has replaced a hydrogen atom in a hydrocarbon) with various heavy metal compounds. These catalysts are necessarily expensive, since the metal alkyls are made from expensive reactants, and moreover usually at least half of the metal destined for combination in the metal alkyls must be sacrificed as relatively worthless by-products. Also the performance of the generality of these catalysts is relatively unsatisfactory, and only a relatively few types have been found to be highly efficient.

Accordingly, it is an object of this invention to provide novel and highly efficient catalysts for the polymerization of olefins.

Another object is to provide such catalysts which are less expensive than other catalysts heretofore available for this purpose.

SYNOPSIS OF THE INVENTION

The above and other objects are secured, in accordance with this invention, by polymerizing an alpha-methylene group containing mono-olefin, in the presence of a catalyst which is a complex reaction product of (1) an adduct of (a) an alkali metal with (b) a polynuclear aromatic compound and (2) a compound of a heavy metal or of boron, silicon or arsenic. The resultant polymers are of high molecular weight, and are of the unbranched chain type, having high melting points and high degrees of crystallinity. The catalysts used in this invention are inherently cheaper than the metal alkyl-heavy metal compound complex catalysts, and are superior in performance to the generality of such catalysts in point of catalytic efficiency and quality of product.

THE MONO-OLEFINS POLYMERIZED

Mono-olefins suitable for polymerization in accordance with this invention include all mono-olefins in which the unsaturated group is an alpha-methylene group having the structure $H_2C=C=$. In general it is preferred to use olefins containing not over 8 carbons. Ethylene is the preferred monomer for use in the invention. Other suitable mono-olefins include for instance propylene, butene-1, isobutylene, pentene-1, hexene-1, octene-1, 2-methyl pentene-1, 3-methyl pentene-1, 3-ethyl pentene-1, and the like. The polymers produced from these monomers in accordance with this invention are of regular and unbranched structure, as reflected by high melting points, mechanical strength and crystallinity.

THE ALKALI METAL AROMATIC COMPOUND ADDUCTS

A relatively unfamiliar mode of reaction is displayed by the reaction of alkali metals directly with polynuclear aromatic hydrocarbons such as naphthalene, anthracene, biphenyl and the like. The reaction results in the formation of salt-like addition compounds without replacing hydrogen in the hydrocarbon, see Paul et al. J.A.C.S. 78, 116 (1956). These compounds show relatively high conductivity in solution, and in the solid isolated state, they are semi-conductors. They are also characterized by a peculiar reaction with mercury, whereby the alkali metal is removed and becomes amalgamated with the mercury, and the aromatic hydrocarbon is regenerated as such. These properties and reactions are in contrast with the usual alkyl, aryl or other hydrocarbon alkali metal compounds in that these latter compounds are made via lengthy syntheses, e.g. by reacting alkali metal with a halohydrocarbon with elimination of alkali halide, whereby a portion of the alkali metal is lost in a relatively worthless form; the usual hydrocarbon alkali metal compounds contain the alkali metal occupying the place of a hydrogen atom in the theoretically underlying hydrocarbon; the usual compounds show relatively low conductivity in solution and no semiconductivity in the solid state; and they react with mercury to exchange alkali metal for mercury, without regeneration of the hydrocarbon. Reverting to the adducts used in this invention, these are prepared by simply agitating the aromatic hydrocarbon and finely-divided alkali metal together in a suitable solvent at ordinary room temperatures (say 15°–30° C.) for a period of time sufficient to carry the reaction to the desired extent. Usually the solvents used in the reaction are ethers, which would interfere with polymerization reactions of this invention, and are therefore displaced after the reaction by distilling with addition of a hydrocarbon solvent. Suitable alkali metals include lithium, sodium, potassium, rubidium and cesium. Suitable aromatic compounds for forming adducts for use in this invention are exemplified by polynuclear aromatic and alkylated aromatic hydrocarbons, such as biphenyl, naphthalene, anthracene, chrysene, stilbene, diphenylmethane, fluorene, naphthacene, 1-methyl naphthalene, phenanthrene, acenaphthene, pyrene, triphenylene, dibenz (a,h) anthracene, graphite, carbon black and the like.

THE HEAVY METAL COMPOUNDS

The heavy metal compounds forming the other component of the complex catalysts of this invention are compounds of boron, silicon or arsenic or of all those elements enclosed by the bracket entitled "Heavy Metals" and by the heavy black lines terminating at said bracket (including the lanthanides) in the periodic chart given in Lange's "Handbook of Chemistry," fifth edition, Handbook Publishers, Inc., 1944, pages 54 and 55. In general, these compounds will be salts and oxides of the cited elements, suitable salts being the chlorides, bromides, iodides, acetylacetonates, alkoxides and the like. Specific suitable compounds for complexing with the alkali metal-aromatic hydrocarbon adducts include for instance titanium tetrachloride, zirconium tetrachloride, zirconium acetylacetonate, tetrabutyl titanate, ferric chloride, ferrous chloride, antimony pentachloride, bismuth trichloride, titanium trichloride, stannic chloride, antimony pentoxide, sodium bismuthate, sodium chromate, chromium chloride, cupric chloride and the like. The complexes are formed by mixing and agitating the alkali metal-aromatic hydrocarbon adduct and heavy metal compound together, preferably in suspension in a saturated aliphatic or aromatic hydrocarbon solvent such as petroleum ether, heptane, benzene, toluene or the like, preferably at low temperatures on the order of $-10°$ C. or lower, say down to $-100°$ C. although temperatures up to 70° or 80° C. may also be employed. The low temperature appears to be important principally at the outset of the reaction between the alkali metal-aromatic hydrocarbon adduct and heavy metal compound, and the temperature may be permitted to rise thereafter. As to the relative proportions of these ingredients, the mole ratio of the alkali metal-aromatic hydrocarbon adduct to the heavy metal compound should be from 1:1 to 10:1 inclusive, and preferably from 2:1 to 9:1 inclusive. The above expressed preferences are based upon considerations of maximizing the yield of polymer with relation to consumption of catalyst.

With the foregoing general discussion in mind, there are given herewith detailed examples of the practice of this invention. All parts given are by weight.

*Example I*

(A) Preparation of adduct:

| | |
|---|---|
| Biphenyl _____ g__ | 30.84 |
| Lithium foil _____ g__ | 2.776 |
| Diethyl ether _____ ml__ | 125 |

A cylindrical stainless steel autoclave 3 inches in inside diameter by 7.5 inches inside length, and containing ten stainless steel rods 0.5 inch in diameter by 7 inches length was provided for this preparation. The autoclave was flushed with argon, the above ingredients were charged, and the autoclave sealed. The autoclave was rotated on its axis at room temperature at the rate of 3 turns per second, for 308 hours. At the end of this time, the reactants were pressured over into a distillation flask, 800 ml. of ether being used to wash the reactants from the autoclave over into the flask. The ether was then removed by vacuum distillation in a current of argon, n-heptane being added during the distillation of the ether to replace the same, the pot temperature being kept at all times below 36° C. When the boiling temperature became constant at 32° C. under 65 mm. absolute pressure, the distillation was discontinued. The product, a chocolate brown slurry, was pressured over into a storage bottle. The slurry had a volume of 775 ml., and contained 0.003154 gram of lithium per ml., as indicated by titration with a standardized hydrochloric acid solution.

(B) Polymerization:

| | |
|---|---|
| n-Heptane _____ | 500 ml. |
| Titanium tetrachloride _____ | 0.95 gram. |
| Lithium biphenyl adduct (prepared as just described) _____ | Per Table II. |

A flask provided with a stirrer, thermometer, gas sparger below the liquid level, reflux condenser, and dropping funnel was used in this experiment. Flow meters were placed in the gas inlet tube and at the outlet of the reflux condenser. Before each experiment, the apparatus was flushed with argon and flamed to clear the apparatus of moisture. Chemically pure (99.5%) ethylene was used in all experiments.

A series of runs was made, using ingredients as listed in the recipe and varying the amount of lithium adduct as set forth in Table I. In each run the n-heptane was charged first, and heated to reflux while bubbling argon into the flask. The flask and contents were then cooled to the temperature selected for the mixing of the catalyst components, agitation commenced, and the lithium adduct and titanium tetrachloride added, after which the temperature was permitted to rise. With continued agitation, ethylene was introduced into the sparger until the mass refused to take up any further ethylene, as indicated by equal readings on the inlet and outlet flowmeters. Usually this occurred in from one to two hours. A few mililiters of methanol were then added to the mass to destroy the unused catalyst, and the polymer was recovered by filtration, and washed successively with alcoholic hydrochloric acid, alcohol, and finally with water until the washings were acid free. The polymer was oven dried at 100° C., and was suitable for the manufacture of molded objects commonly made with straight-chain ethylene polymers.

Set forth herewith in Table I are particulars of the several runs. It will be noted that optimum yields of polymer, based on the weight of catalyst used, were obtained when the catalyst constituents were mixed at temperatures below −10° C., preferably about −25° C., and when the molecular ratio of lithium adduct to titanium tetrachloride was in the range of 2:1 to 9:1 inclusive.

TABLE I

| Dry Wt. of Adduct Used (g.) | Mol Ratio of Adduct to $TiCl_4$ | Weight of Catalyst | Temperature at which Adduct and $TiCl_4$ were mixed | Weight of Product (g.) | Ratio, Product/Catalyst |
|---|---|---|---|---|---|
| 1.26 | 1.5/1 | 2.21 | −11.5 | 6.8 | 3.08 |
| 2.52 | 3/1 | 3.47 | −10 | 19.8 | 5.70 |
| 2.52 | 3/1 | 3.47 | +25 | 4 | 1.15 |
| 5.03 | 6/1 | 5.98 | −10 | 16.2 | 2.70 |
| 2.52 | 3/1 | 2.47 | −25 | 29.6 | 8.25 |

*Example II*

| | |
|---|---|
| Lithium adduct of biphenyl (prepared as described in Example I–A; figure given is dry weight of adduct in the slurry used) _____ grams__ | 2.52 |
| Titanium trichloride _____ do____ | 0.78 |
| n-Heptane _____ ml__ | 500 |

The above ingredients provide a mole ratio for lithium adduct:titanium trichloride of 3:1.

The apparatus of Examples I–B was used in this example. The n-heptane was charged, heated to reflux briefly with a current of argon to purge the apparatus, and then cooled to −10° C. The titanium trichloride and lithium adduct were then added. Ethylene was passed in for 1 hour, and the polymer recovered, as in Example I–B. There was obtained 0.5 gram of polymer.

From the foregoing general discussion and detailed specific examples, it will be evident that this invention provides a novel process, and novel and superior catalysts, for the polymerization of alpha-olefins. The materials used, and particularly the alkali-metal aromatic hydrocarbon adducts, are cheaply and readily obtainable.

What is claimed is:

1. Process of polymerizing an alpha-methylene mono-olefin, containing not over 8 carbons, which comprises contacting the mono-olefin with a catalyst consisting essentially of the reaction product of (1) an adduct of (*a*) an alkali metal with (*b*) a polynuclear aromatic compound selected from the group consisting of biphenyl, naphthalene, antracene, chrysene, stilbene, diphenylmethane, fluorene, naphthacene, 1-methyl naphthalene, phenanthrene, acenaphthene, pyrene, triphenylene and dibenz-(a,h)anthracene and (2) titanium tetrachloride, the ratio of alkali metal to polynuclear aromatic compound being no more than 2 atoms to 1 mole.

2. Process of polymerizing an alpha-methylene mono-olefin containing not over 8 carbons, which comprises contacting the mono-olefin with a catalyst consisting essentially of the reaction product of (1) an adduct of (*a*) an alkali metal with (*b*) a polynuclear aromatic compound selected from the group consisting of biphenyl, naphthalene, anthracene, chrysene, stilbene, diphenylmethane, fluorene, naphthacene, 1-methyl-naphthalene, phenanthrene, acenaphthene, pyrene, triphenylene and dibenz-(a,h)anthracene and (2) titanium trichloride, the ratio of alkali metal to polynuclear aromatic compound being no more than 2 atoms to 1 mole.

3. Process of polymerizing ethylene, which comprises contacting the ethylene with a catalyst consisting essentially of the reaction product of (1) an adduct of (*a*) an alkali metal with (*b*) a polynuclear aromatic compound selected from the group consisting of biphenyl, naphthalene, anthracene, chrysene, stilbene, diphenylmethane, fluorene, naphthacene, 1-methyl naphthalene, phenanthrene, acenaphthene, pyrene, triphenylene and dibenz-(a,h)anthracene and (2) titanium tetrachloride, the ratio of alkali metal to polynuclear aromatic compound being no more than 2 atoms to 1 mole.

4. Process of polymerizing ethylene, which comprises contacting the ethylene with a catalyst consisting essentially of the reaction product of (1) an adduct of (*a*) an alkali metal with (*b*) biphenyl and (2) titanium tetrachloride, the ratio of alkali metal to polynuclear aromatic compound being no more than 2 atoms to 1 mole.

5. Process of polymerizing ethylene, which comprises contacting the ethylene with a catalyst consisting essentially of the reaction product of (1) an adduct of (*a*) an alkali metal with (*b*) biphenyl and (2) titanium tetrachloride, the molecular ratio of said adduct to the titanium tetrachloride being at least 1.0, the ratio of alkali metal to polynuclear aromatic compound being no more than 2 atoms to 1 mole.

6. Process of polymerizing ethylene, which comprises contacting the ethylene with a catalyst consisting essentially of the reaction product of (1) an adduct of (*a*) an alkali metal with (*b*) biphenyl and (2) titanium tetrachloride, the molecular ratio of said adduct to the titanium tetrachloride being in the range of 2:1 to 9:1 inclusive, the ratio of alkali metal to polynuclear aromatic compound being no more than 2 atoms to 1 mole.

7. Process of polymerizing ethylene, which comprises contacting the ethylene with a catalyst consisting essentially of the reaction product produced at a temperature not higher than $-10°$ C. of (1) an adduct of (*a*) an alkali metal with (*b*) biphenyl and (2) titanium tetrachloride, the molecular ratio of said adduct to the titanium tetrachloride being at least 1.0, the ratio of alkali metal to polynuclear aromatic compound being no more than 2 atoms to 1 mole.

8. Process of polymerizing ethylene, which comprises contacting the ethylene with a catalyst consisting essentially of the reaction product produced at a temperature of about $-25°$ C. of (1) an adduct of (*a*) an alkali metal with (*b*) biphenyl and (2) titanium tetrachloride, the molecular ratio of said adduct to the titanium tetrachloride being at least 1.0, the ratio of alkali metal to polynuclear aromatic compound being no more than 2 atoms to 1 mole.

9. A catalyst for the polymerization of olefins consisting essentially of the reaction product produced at a temperature in the range of $-25°$ C. to $+25°$ C. of (1) an adduct of (*a*) an alkali metal with (*b*) a polynuclear aromatic compound and (2) titanium trichloride, the ratio of alkali metal to polynuclear aromatic compound being no more than 2 atoms to 1 mol.

10. A catalyst for the polymerization of olefins consisting essentially of the reaction product of (1) an adduct of (*a*) lithium with (*b*) biphenyl and (2) titanium trichloride, the ratio of lithium to biphenyl being 2 atoms to 1 mol.

References Cited in the file of this patent

UNITED STATES PATENTS

| | | |
|---|---|---|
| 2,721,189 | Anderson et al. | Oct. 18, 1955 |
| 2,822,357 | Brebner et al. | Feb. 4, 1958 |
| 2,827,446 | Breslow | Mar. 18, 1958 |
| 2,867,612 | Pieper et al. | Jan. 6, 1959 |

OTHER REFERENCES

Paul et al.: J. Am. Chem. Soc., 78, 116 (1956).

Lipkin et al.: "Science," vol. 117 (534), May 15, 1953.

"Chemistry of Organic Compounds," by Noller, 2nd edition (1957), page 577 pertinent.